(12) United States Patent
Seth

(10) Patent No.: US 8,359,225 B1
(45) Date of Patent: Jan. 22, 2013

(54) TRUST-BASED VIDEO CONTENT EVALUATION

(75) Inventor: Shashi Seth, Foster City, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/426,216

(22) Filed: Mar. 21, 2012

Related U.S. Application Data

(63) Continuation of application No. 12/037,296, filed on Feb. 26, 2008, now abandoned.

(51) Int. Cl.
  *G06Q 10/10* (2006.01)
(52) U.S. Cl. ........................ 705/7.29; 705/319
(58) Field of Classification Search .................. 705/7.29, 705/7.11, 319
  See application file for complete search history.

(56) References Cited

U.S. PATENT DOCUMENTS

| | | | |
|---|---|---|---|
| 2006/0212931 A1* | 9/2006 | Shull et al. ...................... 726/10 |
| 2008/0059536 A1* | 3/2008 | Brock et al. .................. 707/200 |
| 2008/0109491 A1* | 5/2008 | Gupta ........................ 707/104.1 |
| 2009/0133048 A1* | 5/2009 | Gibbs et al. ..................... 725/14 |
| 2009/0187988 A1* | 7/2009 | Hulten et al. ................... 726/22 |

OTHER PUBLICATIONS

"Characterizing the YouTube video-sharing community", May 2007, 8 Pages, downloaded from http://securityl.win.tue.nl/~bpontes/pdf/yt.pdf.*

* cited by examiner

*Primary Examiner* — Candice D Wilson
*Assistant Examiner* — Ehrin Pratt
(74) *Attorney, Agent, or Firm* — Fenwick & West LLP

(57) ABSTRACT

A system and method determines which uploaded videos to subject to further analysis based upon a measure of trust in the users who uploaded the videos. The evaluation system obtains the information about a user's uploaded video content to a video hosting website, determines a measure of trust of the user's account based on the user information, and ranks or classifies the user into a trust category base on the trust measure. The evaluation system determines the user's trust category responsive to user uploading a video, and selectively evaluates the uploaded video based on the trust category.

31 Claims, 3 Drawing Sheets

TRUST-BASED VIDEO CONTENT EVALUATION

CROSS-REFERENCE TO RELATED APPLICATION

This application is a continuation of U.S. application Ser. No. 12/037,296, filed on Feb. 26, 2008, entitled "Trust-Based Video Content Evaluation", which is incorporated herein by reference in its entirety.

BACKGROUND

1. Field of Art

The present invention relates generally to online video hosting systems for user-contributed content, and specifically to trust-based evaluation of video content.

2. Description of the Related Art

The expansion of networked video sharing provides users with rich opportunities to upload, watch and share videos in fast-growing online video hosting websites. Managing these video files, especially providing efficient and secure copyright protection of these files, is an extremely challenging task. These video hosting websites need a mechanism for identifying and removing undesirable video content. Some video hosting website use human editors to manually identify undesirable video content, but this approach is expensive and time consuming. Other video hosting websites use digital fingerprinting techniques to evaluate video content.

SUMMARY

A method, system, and computer program product determines which uploaded videos to subject to fingerprinting analysis based upon a measure of trust in the users who uploaded the videos.

Generally, information about a user's uploaded video content to a video hosting website is obtained. The information can include data such as number of uploads, frequency of uploads, ratings of the user's videos, negative information associated with the user's uploads, such as complaints, indications of prior copyright violations or takedowns, or the like. Based on the information about the user's video content, a measure of trust is determined for the user's account. The measure of trust is then used to rank or classify the user into a trust category. After the user uploads a video, the user's trust category is determined. Whether the user's uploaded video is further evaluated is based on the trust category. If the user is categorized with a high level of trust, the user's video is posted to the video hosting website without further review. In another category, associated with a moderate level of trust, the user's video is evaluated on a sampled basis, such as evaluating one in every ten uploaded videos by the user. In another category, associated with a low level of trust, all videos of the user are evaluated.

An embodiment of a trust-based video evaluation system includes a trust scoring server, a trust ranking server, and a video evaluation server executed by the trust-based evaluation system. The trust scoring server generates a trust score for a user account based on user interaction information. The trust ranking server ranks the user account based on the trust score. The video evaluation server selectively evaluates videos from a user based on the ranked trust score for the user's account. An embodiment of a method include generating a trust score for a user account based on at least user interaction information, ranking the user account based on the trust score, and selectively evaluating videos from a user based on the level of trust of the user account. Embodiments of the measuring computer program product include a trust scoring server to generate a trust score of a user account using user interaction information, and an evaluation server to selectively evaluate videos from a user based on the level of trust of the user account.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein. In addition, the figures and descriptions have been simplified to illustrate elements that are relevant for a clear understanding of the present invention, while eliminating, for the purpose of clarity, many other elements found in a typical web-based video hosting system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

DETAILED DESCRIPTION

Figure 1:
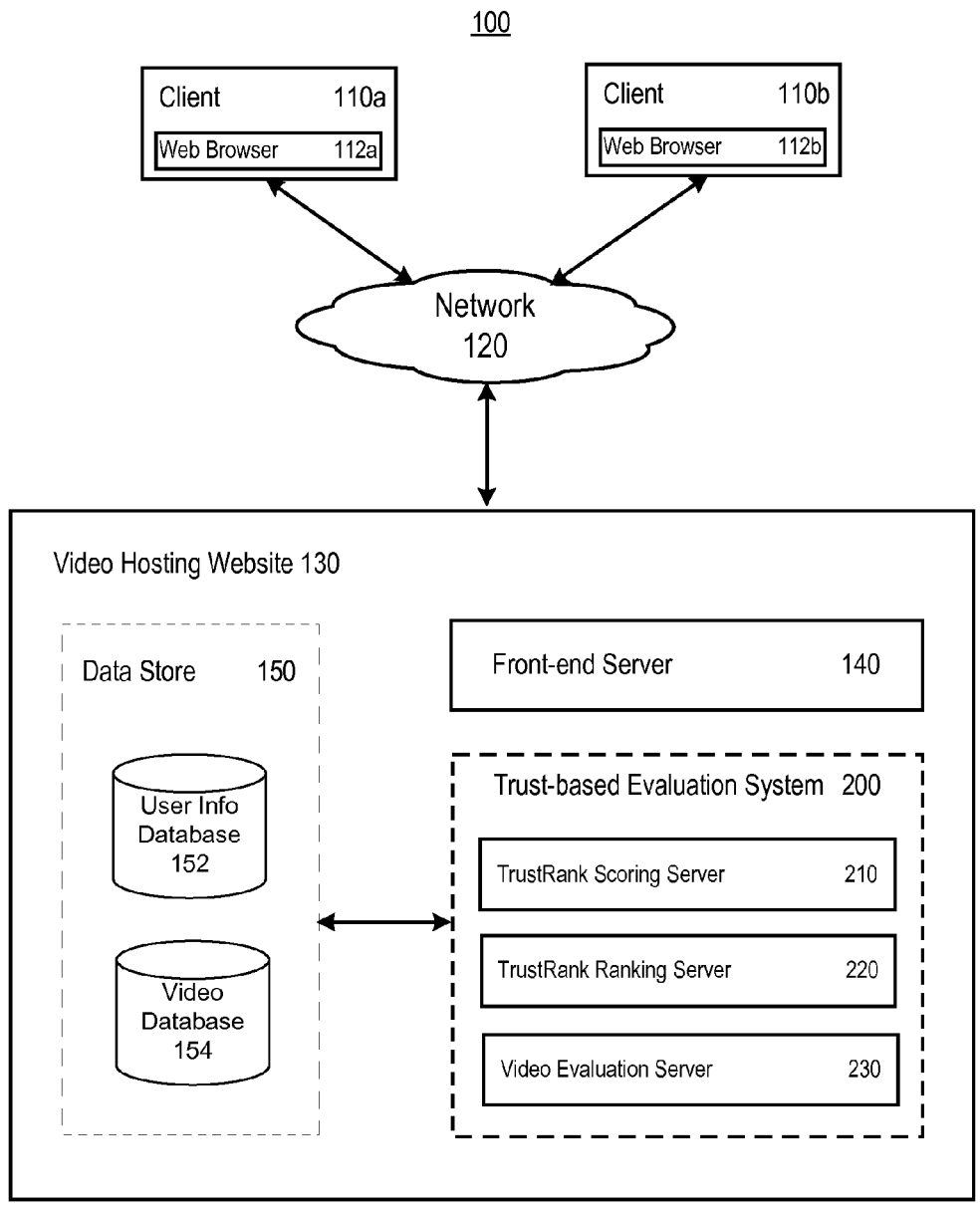
FIG. 1 is a block diagram of an environment having a trust-based video content evaluation system according to one embodiment.

FIG. 1 is a block diagram of a video hosting website 130 having a trust-based video evaluation system 200 according to one embodiment. As shown in FIG. 1, two clients 110 are connected to the video hosting website 130 via a computer network 120. Each client 110 executes a web browser 112. The video hosting website 130 comprises a front-end server 140, a data store 150 which includes a user information database 152 and a video database 154. The video hosting website 130 also comprises a trust-based evaluation system 200. Many conventional features, such as firewalls, load balancers, application servers, failover servers, site management tools, and so forth are not shown so as to more clearly illustrate the features of the system.

The client 110 communicates with the video hosting website 130 via the computer network 120. The client 110 can be a personal computer (PC) or a mobile handset or other electronic computing devices. The client 110 includes, either as part of the browser 112, or as a separate application, a video player (e.g., the Flash™ player from Adobe Systems, Inc.), adapted for the video file formats used on the site 130. Users of the client 110 and browser 112 can upload media content (which can include, for example, video, audio, or a combination of video and audio) to the site 130, and browse media content stored at the site 130. Typically, a user accesses a video from the site 130 by browsing a catalog of videos, conducting searches on keywords, reviewing playlists from other users or the system administrator (e.g., collections of videos forming channels), or viewing videos associated with particular user groups (e.g., communities). Only two clients are included in FIG. 1 in order to simplify the figure. In practice, there will be hundreds, thousands, even millions of clients communicating with the site 130 at any given time.

The network 120 enables communications among the client 110 and the video hosting website 130. In one embodiment, the network 120 uses standardized internetworking communications technologies and/or protocols, known now or subsequently developed that enable the client 110 to communicate with the video hosting website 130. It will be understood that the term "website" represents any computer system adapted to serve content using any internetworking protocols, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

The front-end server 140 is configured to receive one or more videos from a video source. The video source can be, for example, a client computer 110 coupled to the front-end server 140 through the network 120. In this configuration, a user can upload video content to the front-end server 140 from a remote location. Alternatively, the video source can be a database or other storage device coupled to the front-end server 140. For example, the video source can be a video storage medium such as a DVD, CD-ROM, Digital Video Recorder (DVR), hard drive, Flash memory, or other memory.

For purposes of convenience and the description of one embodiment, the media content uploaded and browsed by users and others will be referred to "videos" or "video files", although these files can also be audio files, and other types of media files. The front-end server 140 stores the received videos to the video database 154. The video database 154 stores videos and associated metadata. The video files can be encoded as H.263, H.264, WMV, VC-1 or the like; audio can be encoded as MP3, AAC, or the like. The files can be stored in any suitable container format, such as Flash, AVI, MP4, MPEG-2, RealMedia, DivX and the like. In one embodiment, the front-end server 140 pre-processes the received videos. This processing can include format conversion, compression, metadata tagging, and other data processing. For example, the front-end server 140 can convert the frame rate, frame size, and color depth of a received video to predetermined formats. For example, storage format can be Adobe FLASH®, with a frame size of 320×240 at 15 fps, and 8 bit color.

A video file received by the front-end server 140 is associated with a user account. For example, an uploaded video is associated with a user account responsible for the uploaded video. The front-end server 140 stores the user account information and related user interaction data in the user information database 152. User information of a user account includes the length of time since the user account creation, number of uploads since account creation, number of views of aggregated over the videos uploaded by the user, number of comments posted on the user's videos, number of subscriptions by others to the user's account, number of favorite videos (i.e., the number of times the user's videos have been selected by others as a favorite), and number of user's videos being sent to a friend by others. A "view", in the context of the invention, is any view over by a user on a video page a period of time, e.g., 30 seconds. User information of a user account may also include an indication of whether the user account belongs to a stored white list of trustworthy user accounts for uploading videos to the hosting website 130. Such user information are examples of user interactions with the site 130, which can be further used to rank user account by the video content evaluation system 200.

The video hosting website 130 enables users to rate and comment on videos uploaded by others, as well as mark videos for various characteristics. For example, the video hosting website 130 enables users to mark or flag a video as having inappropriate content for the site (e.g., adult content). Users can also mark a video as a potential copyright violation. Other reasons for marking videos can also be supported, as desired by the system administrator, such offensive content, poor quality of the video (e.g. too dark, out of focus, etc.). The video hosting site 130 may release a flagged video for access by others, or take it down from the site 130 after evaluation. Each take-down incident associated with a user account is counted as a "strike". In one embodiment, a user account is suspended by the site 130 in response to the number of strikes associated with the account having reached a predetermined threshold, for example, three strikes. The front-end server 140 keeps track of each strike associated with a user account and stores the strike information in the user information database 152. The trust-based evaluation system 200 uses the strike information together with other user information associated with a user account to rank the user account for video content evaluation.

The trust-based evaluation system 200 ranks a user account registered with the site 130 based on a measure of trust, which measures a degree of trust of the user for that user account, based on user information stored in the user information database 152. The user information includes information describing the activities of other users with respect to the user's uploaded videos, and may also describe the activities of the user as well. The trust measure is then used for ranking or otherwise classifying the user's account. Based on user account ranking, the trust-based evaluation system 200 selectively evaluates videos uploaded by the user associated with the account. The trust-based evaluation system 200, in one embodiment illustrated in FIG. 1, comprises a trust scoring server 210, a trust ranking server 220 and a video evaluation server 230. Other embodiments may include other servers. The various servers of the video hosting system 200 can be implemented as dedicated hardware, in software, or as combination thereof.

The trust scoring server 210 generates a trust score of a user account using user information stored in the user information database 512. In one embodiment, the trust scoring server 210 generates the trust score using a weighted function on the user information, such as the length of time since account creation, number of views aggregated over all the videos uploaded by a user, and number of strikes associated with the account, the user's presence on a white list, and so forth. The trust scoring server 210 assigns a weight to each item of the user information to be used for the trust score generation. In one embodiment, the scoring server 210 assigns different weights to each item of the user information to be used. For example, the scoring server 210 may assign a higher weight to the number of views than the number of strikes since the number of views indicates a level of popularity of the user's videos, while the number of strikes represents how badly a user behaves over a period of time. In another example, the scoring server 210 may assign higher weight to a user account having a longer length of time since account creation than an account having a shorter short length of time, since a user may improve his or her behavior over the time. In one embodiment, the weight value to be assigned to each item of user information for the trust score generation is a design choice, configurable by the system administrator. Other embodiments may use the weighted function on a different plurality of user information, such as number of uploads and number of views.

The trust ranking server 220 ranks a user account based on the trust score generated by the trust scoring server 210. In one embodiment, the trust ranking server 220 ranks users on a plurality of tiers to represent different levels of trustworthiness. For example, in one embodiment, three tiers of trust can be set, with accompanying trust score thresholds:

Tier 1: Low trust
Tier 2: Moderate trust
Tier 3: High trust

Tier 1 has a lowest trust threshold, and identifies those users who have the lowest level of trust based on their behavior. For these users, all of their uploaded videos will be evaluated by video evaluation server 230.

Tier 2 has a higher trust threshold then Tier 1, and identifies those users who have a moderate level of trust. For these users, their uploaded videos are selectively evaluated by humans, by an automated system, or by some combination of these, for example on a sampled basis.

Tier 3 has a highest trust threshold, and identifies those users who have a highest level of trust; they are deemed to be very trustworthy. For these users, their videos are not evaluated any further, but posted for access in the database 154.

Accordingly, in response to the trust score for user, the trust ranking server 220 ranks the user account. Other embodiments may user different number of tiers, e.g., 2 or 5, to describe the different levels of trust of user accounts. Alternatively, other embodiments can use other ranking mechanisms to represent different levels of trust of user accounts.

To reflect the dynamic changes of user interaction information in the trust measurement, the ranking server 220 periodically updates the trust score and/or trust ranking of the user accounts. In one embodiment, the ranking server 220 adjusts the ranking according to a predetermined schedule. A user account may be upgraded from its current tier to the next higher tier in response to the user not receiving any strikes for some fixed interval (e.g., 2 months since) since the last time the account was ranked. For example, a Tier 2 user may have its account be upgraded to a Tier 3, because there are no strikes in the user's account for 2 month since its last ranking measurement. The ranking server 220 may combine the upgrade schedule with other user information, such as number of videos uploaded, number of views, or any other metadata. For example, to upgrade from one tier to another, the ranking server 220 can include a threshold for the user to upload a minimum number of videos during the interval, for example a minimum of 20 videos. This ensures that the user is sufficiently active to ensure that they do not get upgrade merely based on longevity of their account.

The video evaluation server 230 is selectively invoked to evaluate videos uploaded by a user based on the trust level of the user's account. Taking the three trust tiers example described above, the evaluation server 230 queues all videos uploaded by a Tier 1 user for content evaluation, i.e., an evaluation of whether the video contains copyrighted content and/or inappropriate content. Based on the outcome of the evaluations, the evaluation server 230 selectively releases the inspected videos for sharing and distribution. In response to a video uploaded by a Tier 2 user, the evaluation server 230 selects a subset of the videos provided by the user for content evaluation. For example, the evaluation server 230 can select (e.g., sample) the videos, such as selecting 10% of the videos (e.g., one in every 10). The selection can be sequential (e.g., every tenth video), or randomly so that the desired sampling rate is achieved. Non-selected videos are released by the evaluation server 230. The selection of the sampling value N is a design choice by the system administrator. As noted above, there may be multiple tiers for classification of user's trust, and several different tiers can be provided, each with a different sample rate for evaluating user videos. For videos uploaded by a Tier 3 user, the evaluation server 230 immediately releases the videos without queuing and further evaluation.

The evaluation server 230 can implement automated evaluation methods, such as digital fingerprinting for identification of copyright works, image and/or audio analysis for identification of offensive or inappropriate image content. The evaluation server 230 can support human editorial review of the selected videos.

The trust-based evaluation system 200 makes use of the advantages provided by conventional video content evaluation techniques, such as human visual inspection and digital fingerprinting. By allowing trusted users to upload videos without further evaluation (or only selectively evaluation), the processing loads on the evaluation server 230 are reduced. Basing a user's trust score on his or her uploads in turn leverages the judgments of the wider base of users who access the video hosting website 130. For example, assuming an average 100,000 videos are uploaded everyday to the site 130, identifying 40 to 60% of users who post these videos as trusted by the evaluation system 200 significantly reduces the load on the evaluation server 230.

In addition, the evaluation system 200 can further enhance the video hosting services provided by the site 130 by providing greater levels of upload privileges to more trusted users (e.g., users with higher trust score or in higher tiers). The additional privileges can include being allowed to upload longer videos, videos at a higher resolution, and the like. For example, in a typical embodiment, the video hosting site 130 limits uploaded videos to 10 minutes in length. The evaluation system 200 may be configured to allow a Tier 2 user to upload videos up to 20 minutes in length, while Tier 3 users are allowed to upload videos that are 20 minutes in length, or longer. With additional tiers, various levels of upload privileges may be established.

More trusted users can also be provided with additional features or facilities in the video hosting website 130. These features include enabling the trust users to receive compensation for their videos, providing more prominent display of the videos of the trusted users, such as on the home page of the website 130. For example, the video hosting website 130 may receive revenue from clicks on advertisements displayed near user videos. Users who are identified as trusted (e.g., Tier 3), can be eligible to share in the revenue generated from advertisements displayed near their videos. The website 130 can be configured to track and monitor the revenue from such advertising clicks, and provide a portion of such revenue to the trust users' accounts.

Figure 2:
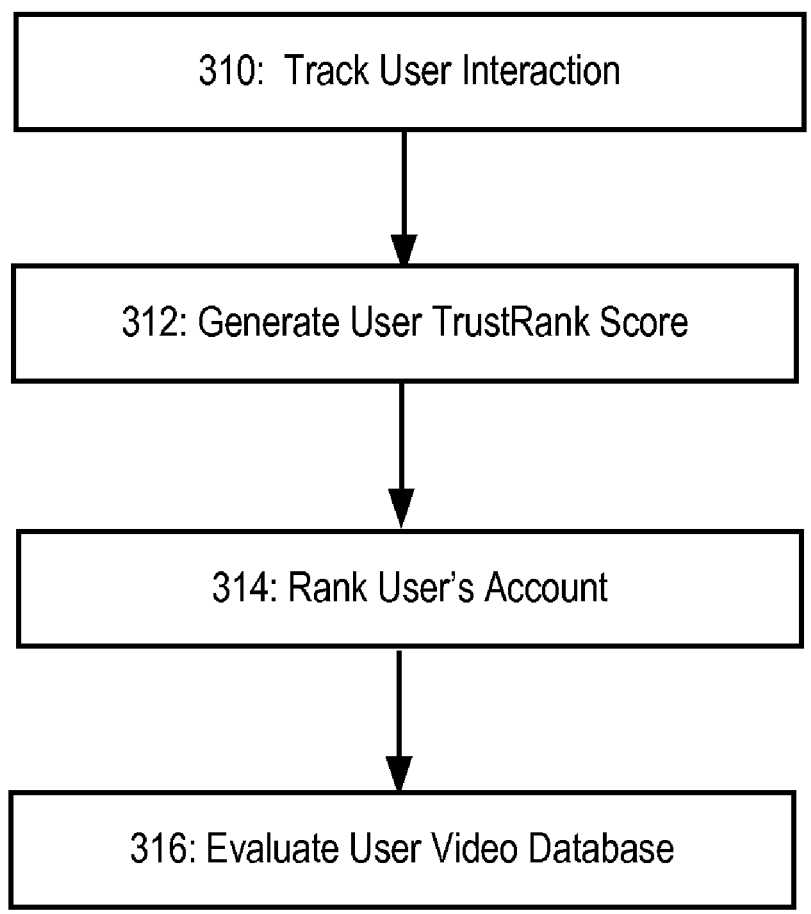
FIG. 2 illustrates a general process flow of using trust-based video content evaluation method according to one embodiment.

FIG. 2 illustrates a general process flow of using trust-based video content evaluation method according to one embodiment. Other embodiments may perform different and/or additional steps than the ones described here. Moreover, other embodiments perform steps in different orders. Initially, when a user logs into the video hosting site 130, the front-end server 140 tracks 310 user interaction with the site 130 and stores user interaction information including user account history in the user information database 152. The scoring server 210 generates 312 a trust score of the user account. The ranking server 220 ranks 314 the user account based on the trust score. The evaluation server 230 selectively evaluates 316 the user's videos.

Figure 3:
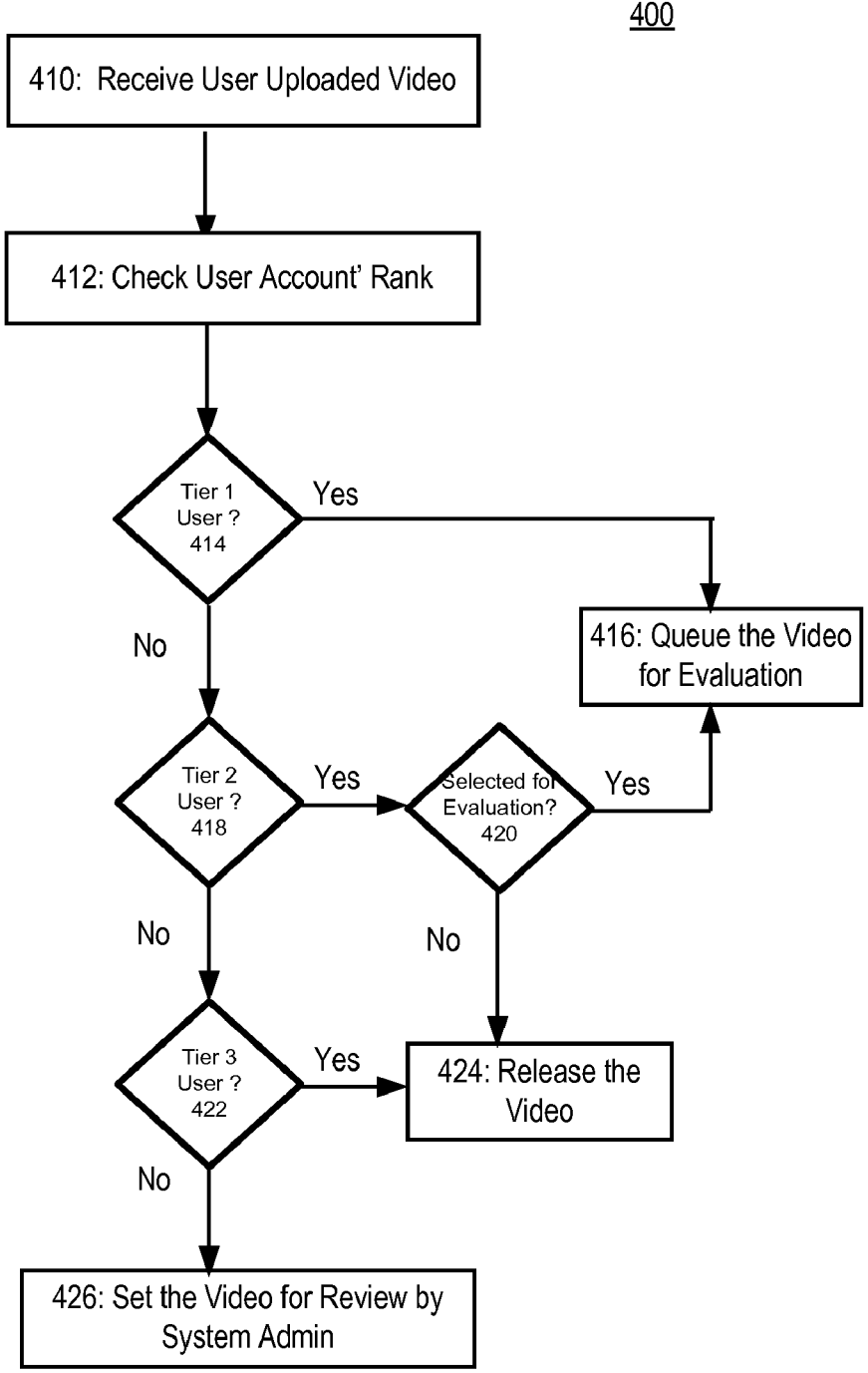
FIG. 3 illustrates a process flow of evaluating video content based on trust-based ranking according to one embodiment.

FIG. 3 illustrates a process flow of evaluating video content provided by a user based on trust-based ranking according to one embodiment. Initially, the front-end server 140 receives 410 an uploaded video from the user for evaluation. The evaluation server 230 checks 412 the rank of the user account associated with the uploaded video. Responsive to the user's tier, the evaluation server 230 selectively processes the user's video. If the user is a Tier 1 user (414), the evaluation server 230 queues 416 the video for further evaluation. If the user is a Tier 2 user (418), the evaluation server 230 determines 420 whether the video is selected for further evaluation, for example by a random or periodic sampling. If the video is selected 420, the evaluation server 230 queues 416 the video for evaluation, otherwise, releases 424 the video. If the user is a Tier 3 user (422), the evaluation server 230 releases 424 the video without queuing, otherwise, the evaluation server 230 sets 426 the video for review by a system administrator.

Other embodiments of evaluating video content provided a user perform different and/or additional steps than the ones described in FIG. 3. Moreover, other embodiments perform steps in different orders. For example, the evaluation server 230 can operate directly on the trust score of the user account without ranking the user account. Based on the trust score of the user account, the evaluation server 230 is selectively invoked to evaluate videos uploaded by the user. The evaluation server 230 can have the user account scored and ranked on demand, i.e., each time a user of a particular tier uploading a video. In this case, the ranking server recalculates the trust rank of the user account. Responsive to the recalculated trust rank, the evaluation server 230 is selectively invoked to evaluate videos uploaded by the user.

Reference in the specification to "one embodiment" or to "an embodiment" means that a particular feature, structure, or characteristic described in connection with the embodiments is included in at least one embodiment of the invention. The appearances of the phrase "in one embodiment" or "a preferred embodiment" in various places in the specification are not necessarily all referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as servers or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A computer system for measuring confidence in a user in a video hosting system, comprising:
 a scoring server, executed by the video hosting system, and configured to generate a trust score based on user information, the trust score representing a measure of trust in the user, and the user information including information describing the activities of other users with respect to the user's uploaded videos; and
 an evaluation server coupled to the scoring server and configured to rank a user account associated with the user into one of a plurality of ranking tiers based on the trust score and to selectively evaluate videos provided by the user based on the trust score, the users of different trust ranks being able to upload videos of different lengths, and wherein users of higher trust ranks being able to upload longer videos than users of lower trust ranks.

2. The system of claim 1, wherein the user information comprises:
a length of time since creation of a user account for the user.

3. The system of claim 1, wherein the user information comprises:
a number of uploads by the user since creation of a user account for the user.

4. The system of claim 1, wherein the user information of the activities of other users with respect to the user's uploaded videos comprises:
a number of users views of the videos uploaded by the user.

5. The system of claim 1, wherein the user information of the activities of other users with respect to the user's uploaded videos comprises:
a number of user comments posted on the videos uploaded by the user.

6. The system of claim 1, wherein the user information of the activities of other users with respect to the user's uploaded videos comprises:
a number of subscriptions by other users to the user's account.

7. The system of claim 1, wherein the user information of the activities of other users with respect to the user's uploaded videos comprises:
a number of times that the user's videos being selected as a favorite video by other users.

8. The system of claim 1, wherein the user information of the activities of other users with respect to the user's uploaded videos comprises s:
a number of the user's videos being sent by other users to another user.

9. The system of claim 1, wherein the user information of the activities of users with respect to the user's uploaded videos comprises:
a number of strikes associated with videos uploaded by the user, a strike corresponding to an event where a video uploaded by a user is identified as inappropriate by at least one other user.

10. The system of claim 1, wherein the scoring server is configured to generate a trust score using a weighted function on a plurality of items of user information.

11. The system of claim 10, wherein the weighted function is based upon a length of time since creation of a user account for the user, number of users views of the videos uploaded by the user, and a number of strikes associated with videos uploaded by the user, a strike corresponding to an event where a video uploaded by a user is identified as inappropriate by at least one other user.

12. The system of claim 1, wherein the evaluation server is further configured to classify the user account associated with the user into one of a plurality of trust categories based on the trust score.

13. A computer method for measuring confidence in a user in a video hosting system, comprising:
generating, by a computer, a trust score based on user information, the trust score representing a measure of trust in the user, and the user information including information describing the activities of other users with respect to the user's uploaded videos; and
ranking a user account associated with the user into one of a plurality of ranking tiers based on the trust score;
selectively evaluating, by the computer, videos provided by the user based on the trust score, the users of different trust ranks being able to upload videos of different lengths, and wherein users of higher trust ranks being able to upload longer videos than users of lower trust ranks.

14. The method of claim 13, wherein the user information comprises:
a length of time since creation of a user account for the user.

15. The method of claim 13, wherein the user information comprises:
a number of uploads by the user since creation of an user account for the user.

16. The method of claim 13, wherein the user information of the activities of other users with respect to the user's uploaded videos comprises:
a number of users views of the videos uploaded by the user.

17. The method of claim 13, wherein the user information of the activities of other users with respect to the user's uploaded videos comprises:
a number of user comments posted on the videos uploaded by the user.

18. The method of claim 13, wherein the user information of the activities of other users with respect to the user's uploaded videos comprises:
a number of subscriptions by other users to the user's account.

19. The method of claim 13, wherein the user information of the activities of users with respect to the user's uploaded videos comprises:
a number of times that the user's videos being selected as a favorite video by other users.

20. The method of claim 13, wherein the user information of the activities of other users with respect to the user's uploaded videos comprises s:
a number of the user's videos being sent by other users to another user.

21. The method of claim 13, wherein the user information of the activities of other users with respect to the user's uploaded videos comprises:
a number of strikes associated with videos uploaded by the user, a strike corresponding to an event where a video uploaded by a user is identified as inappropriate by at least one other user.

22. The method of claim 13, wherein generating a trust score comprises using a weighted function on a plurality of items of user information.

23. The method of claim 22, wherein the weighted function is based upon a length of time since creation of a user account for the user, number of users views of the videos uploaded by the user, and a number of strikes associated with videos uploaded by the user, a strike corresponding to an event where a video uploaded by a user is identified as inappropriate by at least one other user.

24. The method of claim 13, wherein selectively evaluating videos comprises classifying the user account associated with the user into one of a plurality of trust categories based on the trust score.

25. A non-transitory computer-readable storage medium having computer executable code contained therein for measuring confidence in a user in a video hosting system, the computer executable code comprising code for:
generating a trust score based on user information, the trust score representing a measure of trust in the user, and the user information including information describing the activities of other users with respect to the user's uploaded videos; and
ranking a user account associated with the user into one of a plurality of ranking tiers based on the trust score;

selectively evaluating videos provided by the user based on the trust score, the users of different trust ranks being able to upload videos of different lengths, and wherein users of higher trust ranks being able to upload longer videos than users of lower trust ranks.

26. The computer-readable storage medium of claim 25, wherein the user information comprises:
   a length of time since creation of a user account for the user.

27. The computer-readable storage medium of claim 25, wherein the user information of the activities of other users with respect to the user's uploaded videos comprises:
   a number of users views of the videos uploaded by the user.

28. The computer-readable storage medium of claim 25, wherein the user information of the activities of other users with respect to the user's uploaded videos comprises:
   a number of strikes associated with videos uploaded by the user, a strike corresponding to an event where a video uploaded by a user is identified as inappropriate by at least one other user.

29. The computer-readable storage medium of claim 25, wherein the scoring server is configured to generate a trust score using a weighted function on a plurality of items of user information.

30. The computer-readable storage medium of claim 29, wherein the weighted function is based upon a length of time since creation of a user account for the user, number of users views of the videos uploaded by the user, and a number of strikes associated with videos uploaded by the user, a strike corresponding to an event where a video uploaded by a user is identified as inappropriate by at least one other user.

31. The computer-readable storage medium of claim 25, further comprises code for classifying the user account associated with the user into one of a plurality of trust categories based on the trust score.

\* \* \* \* \*

UNITED STATES PATENT AND TRADEMARK OFFICE
CERTIFICATE OF CORRECTION

PATENT NO. : 8,359,225 B1
APPLICATION NO. : 13/426216
DATED : January 22, 2013
INVENTOR(S) : Shashi Seth Page 1 of 1

It is certified that error appears in the above-identified patent and that said Letters Patent is hereby corrected as shown below:

Title page, Abstract: item (57), line 7, delete "base" and insert --based--

In the Claims

Column 9, line 33 (Claim 8, line 3) delete "comprises s" and insert --comprises:--

Column 10, line 10 (Claim 15, line 3) delete "an" and insert --a--

Column 10, line 33 (Claim 20, line 3) delete "comprises s" and insert --comprises:--

Signed and Sealed this
Seventeenth Day of September, 2013

Teresa Stanek Rea
*Deputy Director of the United States Patent and Trademark Office*